United States Patent [19]

Kamath

[11] 4,125,695

[45] Nov. 14, 1978

[54] POLYMERIZATION PROCESS WITH REDUCED CYCLE TIME EMPLOYING POLYFUNCTIONAL FREE RADICAL INITIATORS

[75] Inventor: Vasanth R. Kamath, Tonawanda, N.Y.

[73] Assignee: Pennwalt Corporation, Philadelphia, Pa.

[21] Appl. No.: 757,187

[22] Filed: Jan. 6, 1977

[51] Int. Cl.$^2$ ............................ C08F 2/00; C08F 4/28; C08F 4/04

[52] U.S. Cl. .................................. 526/73; 260/880 R; 526/218; 526/219; 526/228; 526/341; 526/342; 526/345; 526/346

[58] Field of Search .................. 526/73, 218, 219, 228, 526/346

[56] References Cited

U.S. PATENT DOCUMENTS

| | | | |
|---|---|---|---|
| 2,656,334 | 10/1953 | D'Alelio | 526/73 |
| 2,907,756 | 10/1959 | Doak | 526/73 |
| 3,252,950 | 5/1966 | Terenzi et al. | 526/73 |
| 3,293,233 | 12/1966 | Erchak, Jr. et al. | 526/73 |
| 3,585,176 | 6/1971 | Gerritsen et al. | 526/73 |
| 3,649,614 | 3/1972 | Sheppard et al. | 526/219 |
| 3,726,846 | 4/1973 | Squire et al. | 526/73 |
| 3,726,848 | 4/1973 | Squire et al. | 526/73 |
| 3,763,129 | 10/1973 | Sheppard et al. | 526/219 |
| 3,817,965 | 6/1974 | Mace et al. | 526/228 |
| 3,965,145 | 6/1976 | D'Angelo et al. | 526/346 |

FOREIGN PATENT DOCUMENTS

| | | | |
|---|---|---|---|
| 848,620 | 9/1960 | United Kingdom | 526/73 |
| 1,243,197 | 8/1971 | United Kingdom | 526/73 |

OTHER PUBLICATIONS

Noury Chem. Corp., "Polym. of Styrene with Percadox 29" Aug. 1973.

Tulpygina et al., Polymer Science USSR vol. 14, #5 1972, pp. 1143-1153, "Stepwise Radical Polymer & Block Copolymerization Init by Di & Tri Peroxides".

*Primary Examiner*—Herbert J. Lilling

[57] ABSTRACT

A process for the free radical polymerization of vinyl monomers, including vinyl aromatic monomers, wherein the temperature of the polymerization is progressively increased by at least 30° C during the period of the polymerization a temperature range of from 50° C to 160° C and wherein the final temperature is at least 110° C, the polymerization mass including an initiator sensitive to produce free radicals near or at the low temperature end of the range and an initiator sensitive to produce free radicals near or at the high temperature end of the range. A single entity initiator may contain peroxide functions that are actuated to produce free radicals at each of the temperature extremes of the process.

12 Claims, 1 Drawing Figure

4,125,695

POLYMERIZATION PROCESS WITH REDUCED CYCLE TIME EMPLOYING POLYFUNCTIONAL FREE RADICAL INITIATORS

CROSS-REFERENCE TO RELATED APPLICATIONS

The following commonly owned applications, which were filed on the same day as the subject application, disclose novel initiator compositions which can be useful in practice of the present invention:

| Identification Number | Title | Applicant(s) |
| --- | --- | --- |
| IR2238 | Unsymmetrical Diperoxides and Processes of Use in Polymerizing Unsaturated Monomers | Jose Sanchez & Vasanth R. Kamath |
| IR2240 | Diperoxyester Mixture Prepared by Reacting Dihydroperoxides and Carbonyls | Jose Sanchez |

The entire disclosure of the above-identified applications is incorporated herein by reference.

BACKGROUND AND SUMMARY OF THE PRIOR ART

In general, in free radical polymerization (including copolymerization), for a given initiator-monomer system, an increase in the polymerization rate can be obtained by increasing the initiator concentration and/or the polymerization temperature. However, the increase in rate of polymerization is accompanied by a corresponding decrease in molecular weight of the polymer. Therefore, there is great interest in any process that allows one to increase the polymerization rate while maintaining, or even increasing, the molecular weight of the polymer produced.

There are a number of patents which describe a process for the polymerization of styrene in two or more stages and using a mixture of two or more free-radical initiators (e.g. see U.S. Pat. Nos. 2,656,334 and 2,907,756). The polymerization at each stage is conducted isothermally.

The disadvantage of these processes is that the polymerization time (or cycle time) is very long.

In British Pat. No. 1,243,197, Squire and Gammon describe a three component initiator system and a programmed heating cycle in which the temperature is continuously increased, whereby the cycle times can be reduced considerably. In Canadian Pat. No. 892,672, Squire and Gammon describe a process for the polymerization of vinyl aromatic monomers in the presence of two or more free-radical initiators under a programmed heating cycle. They also state that the molecular weight can be raised by adding small amounts of crosslinking agents such as divinyl benzene. In these patents, there is no indication that by using polyfunctional initiators, one can increase the molecular weight of the polymer. In fact, the use of a crosslinking agent (such as divinyl benzene) is advocated to increase the molecular weight of the product.

Belgian Pat No. 668,325 describes a process for suspension polymerization of styrene in two heating steps with the aid of an unsymmetrical diperester. Similarly, U.S. Pat. No. 2,698,863 describes the use of symmetrical diperesters for the polymerization of vinyl monomers at temperatures not exceeding 50° C. Another U.S. Pat. No. 3,585,176 describes the use of unsymmetrical diperesters in two heating steps. Further, the unsymmetrical diperesters of the type disclosed in U.S. Pat. No. 3,585,176 (e.g. di-t-butyl dimethyldiperoxysuccinate) do not give high molecular weight polymer, even when used in conjunction with a programmed temperature cycle.

U.S. Pat. No. 3,817,965 discloses a process for the polymerization of vinyl compounds in suspension to yield high molecular weight polymers. In the process, the temperature of the suspension is increased rapidly from 95° C to a temperature in the range of 100°–150° C and then the temperature is increased (more or less) linearly to a second higher temperature in the range of 120°–160° C. The molecular weight is primarily controlled by adjusting the rate of temperature increase.

In British Pats. Nos. 1,366,976 and 1,366,977, di-t-butylperoxyhexahydroterephthalate and di-t-butyl-peroxyhexahydroisophthalate are used as initiators in the polymerization of styrene, and higher molecular weight polystyrene is obtained, as compared to a benzoyl peroxide initiated system. Polymers of a given molecular weight can be obtained in a shorter time by increasing the initiator concentration.

Ivanchev, et al. [Vysokomol. Soyed., A11, (9), 2082 (1969) English translation in *Polymer Sci. U.S.S.R.* 11:9 (1969), A12, (2), 450 (1970) English translation *Polymer Sci. U.S.S.R.*, 12:514 (1970] investigated the use of symmetrical diperoxides and unsymmetrical diperoxides in isothermal styrene polymerization. They reported that the unsymmetrical diperoxides were capable of giving much higher molecular weight polymer but the molecular weight distribution was bimodal at both low and high conversions. That is, a differential curve of molecular weight distribution showed two distinct peaks, e.g., see *Polymer Sci. U.S.S.R.* 12, 514 (1970) at page 517, FIG. 3. When symmetrical diperesters were used, Ivanchev et al. reported that the molecular weight distribution was unimodal, like the monoperesters but the maxima in the molecular weight distribution curve for the diperesters was lower than that obtained with monoperesters (e.g. t-butyl perbenzoate).

For commercial polymers (e.g. crystal polystyrene), a unimodal molecular weight distribution is required in order that the processing characteristics remain unaffected. Thus the prior art suggests that unsymmetrical diperoxides will not give an acceptable unimodal molecular weight distribution.

Bi- or tri-modal molecular weight distributions were also reported when triperoxides, which decompose by a stepwise first order mechanism, were used as initiators (see Ivanovich et al, Vysakamol. Soyed. A14 (5), 1027 (1972).

Thus Ivanovich et al. teach that symmetrical diperoxides do not give higher molecular weight polymer; that the unsymmetrical diperoxides do give higher molecular weight polymer but with a molecular weight distribution that is bimodal or, in some instances, trimodal.

A Noury product bulletin (5-103-2, Aug. 1973) states that 1,1 di-t-butylperoxy 3,3,5-trimethylcyclohexane gives a higher polymerization rate than does t-butyl perbenzoate and also higher molecular weight, in the isothermal polymerization of styrene at 100° C and 110° C.

STATEMENT OF THE INVENTION

The present invention provides a process for the free radical polymerization of vinyl monomers, including vinyl aromatic monomers, wherein the temperature of the polymerization is progressively increased by at least 30° C during the period of the polymerization a temperature range of from 50° C to 160° C and wherein the final temperature is at least 110° C, the polymerization mass including an initiator sensitive to produce free radicals near or at the low temperature end of the range and an initiator sensitive to produce free radicals near or at the high temperature end of the range. A single entity initiator may contain peroxide functions that are actuated to produce free radicals at each of the temperature extremes of the process.

Using the technique of the present invention in polymerization processes involving grafting reactions, the amount of grafting obtained can be increased.

The programmed temperature cycle used in this process can be either linear or non-linear. The nature of the temperature cycle used influences the polymerization rate as well as the polymer molecular weight.

By using a programmed temperature cycle in the polymerization process, one can use a substantial portion of the heat of polymerization to raise the temperature of the reaction mass and thus reduce the cooling capacity requirements for commercial reactors. Alternately, the commercial reactors may be able to handle the faster polymerization cycles without requiring the addition of extra cooling capacity.

A linear temperature profile is one wherein the polymerization temperature is programmed to increase linearly with time, during the majority or over the entire course of the polymerization. This can be characterized by the term, $\Delta T/\Delta t$, i.e. the rate of change of temperature per unit time. The specific value of $\Delta T/\Delta t$ will be influenced by the initiator system used as well as the desired polymer molecular weight. In general, $\Delta T/\Delta t$ will have a value of about 5°–50° C/hour and preferably, it will have a value of 10°–40° C/hour.

A non-linear temperature profile is one wherein the polymerization temperature is programmed to increase continuously but the rate at which the temperature is increased during the course of the polymerization (i.e. $\Delta T/\Delta t$) is not constant. Generally the rate of temperature increase is adjusted to provide a rate of polymerization as uniform as possible; usualy this requires a progressive decrease in the rate at which the temperature is increased.

The temperature profiles can be used in an operating polymerization temperature range of 40°–200° C, and preferably in the range of 50° to 160° C.

FURTHER DESCRIPTION

Figure 1:
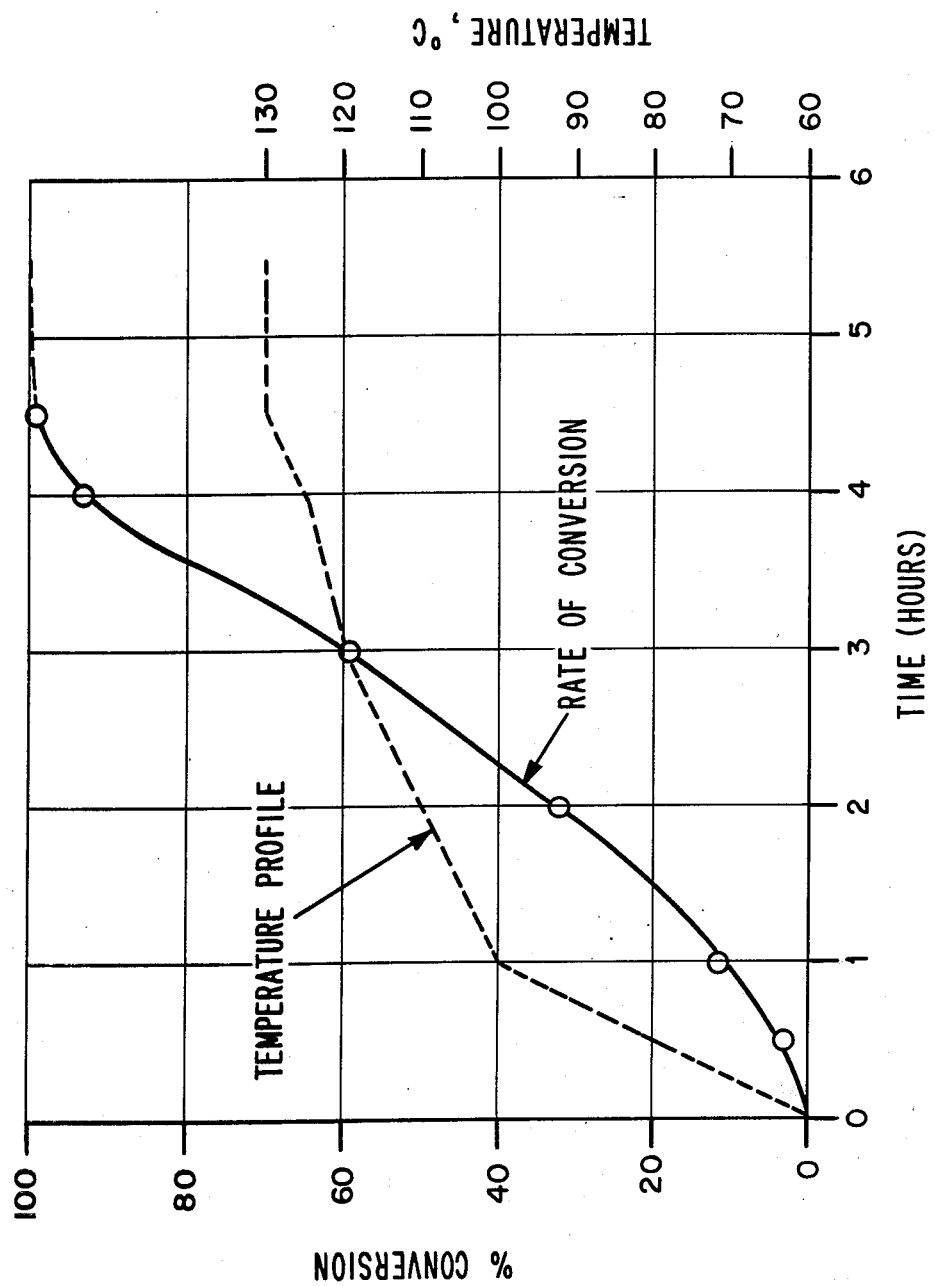
FIG. 1 illustrates the type of a non-linear temperature profile used to provide a relatively constant rate of polymerization, in the bulk polymerization of styrene, to relatively rapidly (i.e. 5.5 hours) obtain polystyrene having a unimodal molecular weight distribution and containing less than 0.1% residual styrene. In the drawing, time in hours is plotted along the abscissa, while temperature in degrees centigrade (having reference to the dotted line) is plotted as ordinate along the right-hand margin while % conversion or polymerization (having reference to the solid line) is plotted as ordinate along the left-hand margin.

The distinction between a time-temperature profile and a staged or step-wise process, can also be expressed mathematically, i.e. in a staged process $dT/dt$ is substantially equal to zero, for most (at least 75%) of the polymerization (where T is temperature and $t$ is time). In a linear temperature profile process, the expression $\Delta T/\Delta t$ is a constant, is never zero and $$\frac{\Delta T1}{\Delta t1} = \frac{\Delta T2}{\Delta t2} = \frac{\Delta T3}{\Delta t3}$$

In the non-linear temperature profile $$\frac{\Delta T}{\Delta t} = \frac{\Delta T1}{\Delta t1} + \frac{\Delta T2}{\Delta t2} + \cdots .$$

In each process the temperature rise in each increment of time is at a finite rate, preferably between 1° C and 100° C per hour.

In the process of the present invention, whether with a linear or a non-linear temperature profile, it is usually advantageous to conduct the polymerization of the final residual monomer, isothermally, at a constant, final temperature. Generally, in the present process, the temperature is not held constant until the reaction mixture contains less than 1% residual monomer.

In general, with styrene, the polymer at the start and end of the final, staged, heating step will have a molecular weight distribution $$\frac{\overline{M_w}}{\overline{M_n}}$$

in the range of 2 to 4 (usually 2.5–3), where $M_w$ is the weight average molecular weight and $M_n$ is the number average molecular weight (as determined by the well-known gell permeation chromatographic technique).

The usual commercial processes for the manufacture of polystyrene are such that the polymerization time is of the order of about 8 to 14 hours, depending on the desired molecular weight. Usually, the weight-average molecular weight of commercial polystyrene is in the range of 200,000 to 350,000. The molecular weight distribution of the polymer, is between 2 and 3 and distributed over a bell-shaped curve (i.e., unimodal).

In contrast, in those prior art processes where the final polymer has a bimodal distribution, if one treats them mathematically as overall unimodal, $$\frac{\overline{M_w}}{\overline{M_n}}$$

is usually greater than 4 (e.g. 9), and always greater than 3.

When using a temperature profile, the process can be modified such that towards the end of the polymerization (i.e. the last 10–20% conversion), the process is conducted isothermally, that is, at a final stage where $\Delta T/\Delta t = 0$. As noted above, this is useful to reduce the residual monomer content of the polymer, since in some polymerizations increasing the temperature above a certain value leads to polymer degradation, resulting in a lower average molecular weight. Also in some polymerizations, as for example in the manufacture of the expandable polystyrene beads, the upper range of polymerization temperature is restricted by the presence of the low boiling expanding agent such as pentane. In such systems, the process can be conveniently altered such that once the critical temperature is attained, the polymerization temperature is maintained constant throughout the rest of the polymerization.

INITIATORS

A wide variety of poly-functional free radical initiators can be used in this invention. It is important in the present invention that whatever initiator or initiator mixture is used be capable of providing free-radicals near or at the extremes in temperature of the temperature profile through which the polymerizing mass progresses during the process. Suitable initiators can be broadly classified into three categories.

(1) Poly-functional peroxides
(2) Poly-functional azo initiators
(3) Poly-functional azo-peroxide initiators, containing at least one azo and at least one peroxide group.

The initiators can be either unsymmetrical or symmetrical in structure; however, relatively poor results are obtained in the polymerization of styrene when using unsymmetrical diperoxides wherein the two peroxide groups are separated by fewer than 6 carbon atoms.

Among the initiators which are useful in the present invention are those found in the following patents, all of which are incorporated herein by reference:

U.S. Pat. No. 3,649,614, Sheppard and MacLeay, (Polyazo initiators);
U.S. Pat. No. 3,706,818, Mageli and D'Angelo, (Polyperoxides);
U.S. Pat. No. 3,725,455, D'Angelo, Mageli and Sheppard, — (Peroxy compounds containing a carbonate group);
U.S. Pat. No. 3,746,735, Bafford, kamens and Mageli, (Diperesters);
U.S. Pat. No. 3,755,288, Sheppard and MacLeay, (Bisazo compounds);
U.S. Pat. No. 3,763,129, Sheppard and MacLeay, (Polyazo sequential initiators);
U.S. Pat. No. 3,812,095, Sheppard, MacLeay and Bafford, (Peroxide - Aliphatic azo compounds);
U.S. Pat. No. 3,839,390, D'Angelo and Mageli, (Polyperoxides);
U.S. Pat. No. 3,860,674, Sheppard, MacLeay and Bafford, (Compounds having peroxy and aliphatic azo groups);
U.S. Pat. No. 3,868,359, Sheppard and MacLeay, (Symmetrical Triazo sequential free radical initiators having two different azo functions); and
U.S. Pat. No. 3,686,102, Groepper and Sanchez, (Beta-substituted diperoxyketals).

Also included are compounds with the general structure:

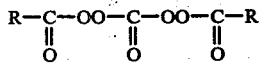

described in U.S. Pat. No. 3,316,228 to Guillet and Towne, issued Apr. 25, 1967, the compounds described in British Pat. Nos. 1,366,977 and 1,366,976, compounds of the type described in U.S. Pat. No. 3,652,631 (Stevens and Wartmann, Mar. 28, 1972) and compounds of the type described in U.S. Pat. Nos. 3,287,337 and 3,337,602. The known monofunctional azo and peroxide free radical initiators can be used in the practice of this invention, as components of an initiator mixture or combination where at least one component is a polyfunctional free radical initiator. Preferably in such combinations there will be a major proportion of one or more polyfunctional initiators and a minor proportion of one or more monofunctional initiators.

Some of the peroxide type initiators are,
t-butylperoxypivalate;
decanoyl peroxide;
lauroyl peroxide;
acetyl peroxide;
t-butyl peroctoate;
benzoyl peroxide;
t-butyl peracetate;
t-butyl peroxyisopropylcarbonate;
t-butyl perbenzoate, dicumyl peroxide;
di-t-butyl peroxide, etc.

Some of the azo type initiators are,
azo-bis-isobutyronitrile;
2-t-butylazo-2-cyanopropane;
1-t-butylazo-1-cyanocyclohexane;
2,2'-azo-bis-2-methylvaleronitrile;
1,1'-azo-bis-cumene, etc.

The specific initiators used in the Examples as illustrative of the above broad classes are tabulated hereinafter.

UNSATURATED MONOMERS

All vinyl and/or vinylidene type monomers which can be polymerized by a free radical mechanism can be used in the practice of this invention. This includes vinyl aromatic monomers such as styrene, substituted styrenes, vinyl toluene, etc.

Esters of acrylic/methacrylic acid such as methyl acrylate, methyl methacrylate, eithyl methacrylate, lauryl methacrylate, isobutyl methacrylate, diethyleneglycoldimethacrylate, trimethylolpropane trimethacrylate, etc.

Other vinyl esters such as vinylacetate, vinyl propionate, vinyl stearate, etc.

Diene monomers such as butadiene, isoprene, chloroprene, etc.

Other monomers such as vinyl chloride, vinylidene chloride, tetrafluoroethylene, acrylamide, methacrylamide, etc.

Allylic monomers such as di-allyl-phthaalate, di-allylmaleate, allyl diglycol carbonate, etc.

Acrylonitrile, methacrylonitrile.

In the practice of this invention, the polymerization can be conveniently carried out in bulk, solution or suspension medium. The polymerization can be either a batch process or a continuous process.

When the polymerization is conducted in suspension, an aqueous medium with suspending agents such as polyvinyl alcohol, tricalcium phosphate, methyl cellulose, etc. is generally used. Based on the specific polymerization system, one or more suspending agents can be used, with or without other anionic and/or cationic surface active agents (i.e. emulsifiers).

Buffering agents can also be added to the suspension to control the pH of the medium. While the pH is not a major criterion in the practice of this invention, depending on the specific system, adjusting the pH to a certain desired value can assist the optimization of the process.

The total free radical initiator concentration in the system can be from 0.005 to 2.5% by weight based on total monomer concentration. The preferred initiator concentration is is 0.05 to 1.0% by weight.

The concentration of the di- or poly-functional initiator is 5 to 95% of the total initiator concentration and preferably from 10 to 90%.

ILLUSTRATIVE EXAMPLES

Experimental Procedure

In the Examples that follow, unless otherwise indicated, based on a charge of 5 g. monomer (styrene), the amount of each initiator component required was calculated using its assay value. Thus, all initiator concentrations are expressed on a pure basis. The initiators were weighed in "petti-cups" which were placed in clean pyrex test-tubes, 18 × 150 mm. 5 g. of distilled styrene was added to the test tubes which were then chilled in ice-water, purged with nitrogen and sealed with a flame torch.

The sealed test-tubes were immersed in a thermostated, stirred oil-bath. The temperature of the oil-bath was adjusted at the desired rate by using a rheostat.

At the end of the polymerization, the test-tubes were removed from the oil-bath and placed in previously cooled copper tubes and then in a freezer (to insure that there was no post-polymerization) for at least half-an-hour. The cooled test-tubes were broken and the polymer was dissolved in 50 ml. of benzene (containing 0.01 g. benzoquinone per liter of benzene). A portion of this solution was used to determine the residual styrene content by gas chromatography. The rest of the solution was precipitated in 300 ml. of methanol. The polymer was filtered and dried in a vacuum oven at 50° C.

To calculate the viscosity-average molecular weight (M), a benzene solution of the polymer 0.5 g/dl was used to measure the viscosity in a Cannon-Ubbelhode viscometer at 25° C. By extrapolating the viscosity data to zero concentration, the value of intrinsic viscosity ([n]) was obtained from which $M_v$ was calculated by using the following formula from J. Phys. Chem. 67, 566 (1963):

$$[n] = K \overline{M}_v^a$$

$K = 9.18 \times 10^{-5}$
$a = 0.743$

The molecular weight distribution of the polymer was determined by using gel permeation chromatography and a calibration curve constructed by using narrow molecular weight distribution, anionically prepared polystyrene samples of different molecular weights.

The viscosity-average molecular weight of polymethylmethacrylate was calculated by using the following formula of H. J. Cantow and G. V. Schulz, Z Physik. Chem. (N.F.) 2, 117 (1954):

$$[n] = K \overline{M}_v^a$$

where
$K = 5.5 \times 10^{-5}$
$a = 0.76$

The chemical identity of the various initiators used in the Examples (with a reference to the relevant Examples) including an abbreviation for each is tabulated below.

INITIATORS USED IN EXAMPLES

| Ex. No. | (I) Monofunctional, Symmetrical | |
|---|---|---|
| 1,5,13 14,15 16,17 | BPO | benzoyl peroxide |
| 10,12,13 | LUPEROX 500R | Dicumyl peroxide |
| | (II) Monofunctional, Unsymmetrical | |
| 1,10 14,15 16,17 | TBPB | tertiary butyl perbenzoate |
| 1,4,6 8,9,10 11,14,17 | LUPERSOL 256 | 2,5-dimethyl-2,5-bis-[2-ethylhexanoylperoxy]-hexane |
| 1,6,8 10,11,14 16,17,18 | LUPEROX 118 | 2,5-dimethyl-2,5-bis-[benzoylperozy]hexane |
| 6 | R-EE | Di-[2-(t-butylperoxy-carbonyloxy)ethyl]ether |
| 7 | R-A76 | Ethylene-bis(4-t-butylazo-4-cyanovalerate) |
| 7,11 | LUPERSOL 331 | 1,1-bis(t-butylperoxy)-cyclohexane |
| 9,12,13 | DTBA | Di-t-butyldiperoxyazelate |
| 10 | LUPERSOL 231 | 1,1-bis(t-butylperoxy)-3,3,5-trimethylcyclohexane |
| 14 | R-262 | Di-t-butyl diperoxycarbonate |
| 18 | BPC-CH | 1,4-di-(t-butylperoxycarbonyl)-cyclohexane |
| | (IV) Difunctional, Unsymmetrical | |
| 2,3,10,12 | R-H | Mixture of 1,8 and 1,9-di-(t-butylperoxycarbonyl)-heptadecane |
| 2,10,11 14,15 16 | R-C | Mixture of 4 and 5-(t-butyl-peroxycarbonyl)-3-hexyl-6-[7-(t-butylperoxycarbonyl)-heptyl]cyclohexene, and 4 and 5-(t-butylperoxycarbonyl)-3-pentyl-6-[8-(t-butylperoxy-carbonyl)octyl]-cyclohexene (i.e. a mixture of 4 isomers) |
| 4,7,9 10,18 | R-233 | Ethyl-3,3-bis(t-butylperoxy)-butyrate |
| 3 | BMPS | Di-t-butyl a,a-dimethyl-diperoxysuccinate |
| 3 | BOPS | Di-t-butyl n-octyldiperoxy-succinate |
| 3 | BPMS | Di-t-butyl diperoxymethyl-succinate |
| | (V) Trifunctional, Unsymmetrical | |
| 4 | R-BP | Di-[2-(t-butylperoxycarbonyl)-benzoyl]peroxide |
| 5 | R-S604 | Di-t-butyl-4,4'-azobis-(4-cyanoperoxyvalerate) |
| | (VI) Tetrafunctional, Unsymmetrical | |
| 2 | R-2C | Consists of 4 isomers, as in R-C, 4 and 5-[1,1,4,4-tetra-methyl-4-(t-butylperoxy)-butylperoxy-carbonyl]-3-hexyl-6-[7-(1,1,4,4-tetra-methyl-4-(t-butylperoxy)butyl-peroxycarbonyl)heptyl]cyclo-hexene, and 4 and 5-[1.1.4.4-tetramethyl-4-(t-butylperoxy)-butylperoxycarbonyl]-3-pentyl-6-[8-(1,1,4,4-tetramethyl-4-(t-butylperoxy)butyl-peroxycar-bonyl)octyl]cyclohexene |
| 2 | R-2H | Mixture of 1,8 and 1,9-di-[1,1,4,4-tetramethyl-4-(t-butylperoxy)butylperoxy-carbonyl]-heptadecane |
| | (VII) OTHERS | |
| 6 | R-BPH | A mixture of 2,5-dimethyl-2-(2-ethylhexanoylperoxy)-5-(benzoylperoxy)hexane, LUPERSOL 256 and LUPEROX 118. Although all of these components are difunctional and symmetrical, this mixture acts like the unsymmetrical initiators. |

In the table, the term "symmetrical" indicates the manner of activity as an initiator and not necessarily structural symmetry. For example, "R-BP", Di-[2-(t-butylperoxycarbonyl)benzoyl]peroxide, is a symmetrical structure, however, it is unsymmetrical in activity as an initiator.

EXAMPLE 1

In order to determine the effect of two-stage polymerization (each at constant temperature) and programmed temperature cycle polymerization on the molecular weight of polymer with different initiators, the following initiator systems were used in the bulk polymerization of styrene.

| System | Composition |
|---|---|
| A | 0.25 phm BPO + 0.05 phm TBPB |
| B | 0.25 phm BPO + 0.05 phm LUPEROX 118 |
| C | 0.25 phm LUPERSOL 256 + 0.05 phm TBPB |
| D | 0.25 phm LUPERSOL 256 + 0.05 phm LUPEROX 118 |

The total weight of initiator used was the same in all the blends (0.30phm) where "phm" refers to parts by weight of initiator per hundred parts by weight of monomer (styrene).

In the two-stage polymerization, the first stage of the polymerization was done at 90° C for 4 hours and the second stage at 120° C for 4 hours (a total of 8 hours).

In the programmed temperature cycle polymerization, the following non-linear time-temperature profile was used (for a total of 5 hours):

| Time (Hours) | 0 | 0.5 | 1.0 | 2.0 | 3.0 | 4.0 | 5.0 |
|---|---|---|---|---|---|---|---|
| Temperature (° C) | 80 | 90 | 100 | 115 | 125 | 135 | 140 |

In each of the above runs a conversion in excess of 99.9% was obtained. The viscosity-average molecular weight ($\overline{M}_v$) for the four initiator blends were as follows:

| System | Two Stage $\overline{M}_v \times 10^{-5}$ | Programmed Cycle $\overline{M}_v \times 10^{-5}$ |
|---|---|---|
| A | 1.27 | 1.70 |
| B | 2.00 | 1.92 |
| C | 1.74 | 2.08 |
| C | 2.00 | 1.94 |

For commercial acceptability, the value of $\overline{M}_v$ should be approximately 180,000 or higher for the different grades of polystyrene. In the above results, with a mixture of monofunctional initiators, i.e. blend A, an increase in the molecular weight of the polymer over two-stage polymerizations observed in a programmed temperature cycle polymerization, yet the molecular weight of the resulting polymer is still below the commercially acceptable range.

On the other hand, with a mixture of difunctional initiators, i.e. blend D, the molecular weight is such that the polymer would be commercially acceptable. The significant feature is that the polymerization time has been reduced from 8 hours in the two-stage system to 5 hours in the programmed cycle. This reduction in the polymerization time is of great advantage in the manufacture of polystyrene where the present processes require a polymerization time of 8 hours or more.

In blends B and C, only one component is a difunctional initiator, i.e. LUPEROX 118 in blend B and LUPERSOL 256 in blend C. With these two blends also, one is able to obtain polystyrene with commercially acceptable molecular weight by going from a two-stage system to a programmed temperature cycle, with concurrent reduction in the polymerization time. These results however also show that the two blends behave slightly differently in that with blend C a reduction in the polymerization time is accompanied by an increase in the molecular weight of the polymer. On the other hand, with blend B, reduction in polymerization time is accompanied by a slight decrease in molecular weight.

EXAMPLE 2

This example shows that poly-functional initiators which are sequential initiators (i.e. initiators which decompose in two or more stages to produce free radicals) can also be used with the programmed temperature cycle or time-temperature profile in the bulk polymerization of styrene.

Each of the indicated initiators was added at 0.25 phm concentration, otherwise the procedure used was the same as the portion of Example 1 which utilized a non-linear time-temperature profile.

The molecular weight results for the polymers produced by these four sequential initiators were as follows:

| System | $\overline{M}_v \times 10^{-5}$ | $\overline{M}_w/\overline{M}_n$ |
|---|---|---|
| R-H | 2.43 | 2.94 |
| R-C | 2.50 | 2.80 |
| R-2H | 3.24 | 2.90 |
| R-2C | 3.17 | 2.91 |

These results show that these sequential initiators can produce high molecular weight polymer in a reduced time, compared to the prior art. The tetrafunctional sequential initiators (i.e. R-2H and R-2C) gave a higher molecular weight than the corresponding difunctional sequential initiators (i.e. R-H and R-C). All four initiators gave polymer with approximately the same molecular weight distribution.

The sequential initiators used in this example can be classified as unsymmetrical poly-functional peresters.

EXAMPLE 3

This example shows that certain unsymmetrical disperesters (of the type described in U.S. Pat. No. 3,585,176) which contain less than 6 carbon atoms separating the peroxide groups are not as effective as other initiator systems illustrated herein in reducing the time required for the bulk polymerization of styrene even when a programmed temperature cycle is used.

The following initiators were evaluated:

| System | Compound |
|---|---|
| BMPS | Di-t-butyl dimethyldiperoxysuccinate |
| BOPS | Di-t-butyl n-octyldiperoxysuccinate |
| BPMS | Di-t-butyl diperoxymethylsuccinate |

The results obtained with these initiators was compared with the initiator R-H, as a control.

The initiator concentration in each case was 0.25 phm and the following non-linear time-temperature profile was used:

| Time (Hours) | 0 | 0.5 | 1.0 | 2.0 | 3.0 |
|---|---|---|---|---|---|
| Temperature (° C) | 80 | 100 | 120 | 135 | 145 |

The results obtained were as follows:

| System | $\overline{M}_v \times 10^{-5}$ | % Conversion |
|---|---|---|
| BMPS | 1.63 | 93.8 |
| BOPS | 1.65 | 96.2 |
| BPMS | 1.55 | 98.0 |

-continued

| System | $\overline{M}_v \times 10^{-5}$ | % Conversion |
|---|---|---|
| R-H | 2.12 | 96.5 |

These results show that compared to the control difunctional initiator mixture, R-H, the other three difunctional initiators (all of which contain less than 6 carbons separating the peroxide groups) gave polymer with a significantly lower molecular weight.

EXAMPLE 4

The trifunctional, sequential initiator used in this example, di-[2-t-butylperoxycarbonyl)benzoyl]peroxide (R-BP) is unsymmetrical in activity, contains a diacyl peroxide group and two perester groups and is useful in the bulk polymerization of styrene.

| System | Composition |
|---|---|
| R-BP | 0.25 phm R-BP |
| E | 0.15 phm R-BP + 0.10 phm LUPERSOL 256 |
| F | 0.25 phm R-BP + 0.02 phm R-233 |
| G | 0.15 phm R-BP + 0.10 phm LUPERSOL 256 + 0.02 phm P-233 |

The non-linear time-temperature profile used was as follows:

| Time (Hours) | 0 | 0.5 | 1.0 | 2.0 | 3.0 | 4.0 |
|---|---|---|---|---|---|---|
| Temperature (° C) | 80 | 95 | 110 | 130 | 140 | 145 |

The results obtained were as follows:

| System | % Conversion | $\overline{M}_v \times 10^{-5}$ |
|---|---|---|
| R-BP | 99.9 | 2.33 |
| E | 99.9 | 2.18 |
| F | 99.9 | 2.26 |
| G | 99.9 | 2.26 |

These results show that the sequential initiators are effective even when used in combination with other initiators which are not sequential initiators. Further, the polymerization cycle time was reduced to 4 hours, yet the molecular weight of the polymer is in the commercially acceptable range.

EXAMPLE 5

The sequential initiator used in this example, in the bulk polymerization of styrene, R-S604, contains an azo group and two perester groups. This was evaluated both alone and in combination with BPO.

| System | Composition |
|---|---|
| R-S604 | 0.50 phm R-S604 |
| H | 0.05 phm R-S604 + 0.25 phm BPO |
| BPO | 0.25 phm BPO |

Here a linear temperature profile was used. The starting polymerization temperature was 70° C and the temperature was increased at the rate of 10° /hour. The total polymerization times was 5 hours.
The results obtained were as follows:

| System | % Conversion | $\overline{M}_v \times 10^{-5}$ |
|---|---|---|
| R-S604 | 97.6 | 2.06 |
| H | 95.6 | 1.89 |

-continued

| System | % Conversion | $\overline{M}_v \times 10^{-5}$ |
|---|---|---|
| BPO | 84.2 | 1.76 |

These results show that with the sequential initiator, higher molecular weight polymer is obtained even though the amount of initiator used is substantially higher. However, it also shows that the bulk of the sequential initiator can be replaced by a monofunctional (BPO in this case) and still get a polymer with a higher molecular weight as compared to polymer prepared from monofunctional initiators (i.e. comparing results of $\overline{M}_V$ for Systems H and BPO).

As opposed to the earlier examples where a non-linear temperature profile was used, in this example, a linear temperature profile was used to reduce the polymerization cycle time. This demonstrates that one can use either a linear or a non-linear temperature profile to conduct the polymerization.

EXAMPLE 6

The sequential initiator used in this example in the bulk polymerization of styrene was R-BPH, which is an unsymmetrical diperester mixture. This was used alone and the results obtained were compared with those obtained from two different mixtures of difunctional initiators.

| System | Composition |
|---|---|
| RBPH | 0.30 phm R-BPH |
| I | 0.25 phm LUPERSOL 256 + 0.05 phm LUPEROX 118 |
| J | 0.25 phm LUPERSOL 256 + 0.05 phm R-EE |

The non-linear programmed temperature cycle used was as follows:

| Time (Hours) | 0 | 0.5 | 1.0 | 2.0 | 3.0 | 4.0 | 5.0 |
|---|---|---|---|---|---|---|---|
| Temperature (° C) | 80 | 90 | 100 | 115 | 125 | 135 | 140 |

The results obtained were as follows:

| System | % Conversion | $\overline{M}_v \times 10^{-5}$ |
|---|---|---|
| R-BPH | >99.9 | 2.14 |
| I | >99.9 | 1.83 |
| J | >99.9 | 2.13 |

EXAMPLE 7

In this example, a difunctional azo initiator, R-A76 was used in combination with peroxide initiators in the bulk polymerization of styrene. The initiator system consisted of 0.25 phm R-A76 + 0.05 phm LUPERSOL 331 + 0.02 phm R-233.

The non-linear programmed temperature cycle used was as follows:

| Time (Hours) | 0 | 0.5 | 1.0 | 2.0 | 3.0 |
|---|---|---|---|---|---|
| Temperature (° C) | 80 | 100 | 120 | 135 | 145 |

Results obtained were as follows:

% Conversion = 99.8

$\overline{M}_V \times 10^{-5} = 1.82$

The results show that poly-functional azo initiators can also be used to obtain polymers with commercially acceptable molecular weight. Note that the cycle time of polymerization is 3 hours, yet the polymer molecular weight is high enough to be commercially acceptable.

EXAMPLE 8

This example shows that, for a given initiator system, the nature of the programmed temperature cycle used has an effect on the molecular weight of the polymer.

The initiator, used in the bulk polymerization of styrene, was a blend of two difunctional initiators, 0.25 phm LUPERSOL 256 + 0.05 phm LUPEROX 118.

Three different temperature profiles are illustrated.

(I) Linear profile, with an initial temperature of 70° C and where the temperature is increased at the rate of 12/hour. Total polymerization time is 5 hours.

(II) Linear profile, with an initial temperature of 80° C and where the temperature is increased at the rate of 12/hour. Total polymerization time is 5 hours.

(III) Non-linear profile

| Time (Hours) | 0 | 0.5 | 1.0 | 2.0 | 3.0 | 4.0 | 4.5 |
|---|---|---|---|---|---|---|---|
| Temperature (° C) | 80 | 90 | 100 | 115 | 125 | 135 | 140 |

The molecular weight results obtained were as follows:

| Profile | $\overline{M}_v \times 10^{-5}$ |
|---|---|
| I | 2.32 |
| II | 2.24 |
| III | 2.13 |

These results establish that for a given initiator system, the molecular weight of the polymer can be changed by changing the initial polymerization temperature as well as the type of profile.

EXAMPLE 9

For a given programmed temperature cycle, varying the concentration of the initiator (or mixture of initiators) will alter the molecular weight of the polymer as well as the % conversion attained. This is demonstrated in this example where the concentration of one of the initiator components is changed in the bulk polymerization of styrene.

| System | Composition |
|---|---|
| K | 0.1 phm LUPERSOL 256 + 0.025 phm DTBA + 0.02 phm R-233 |
| L | 0.1 phm LUPERSOL 256 + 0.05 phm DTBA + 0.02 phm R-233 |
| M | 0.1 phm LUPERSOL 256 + 0.075 phm DTBA + 0.02 phm R-233 |

The non-linear programmed temperature cycle used was as follows:

| Time (Hours) | 0 | 0.5 | 1.0 | 2.0 | 3.0 | 4.0 |
|---|---|---|---|---|---|---|
| Temperature (° C) | 80 | 95 | 110 | 125 | 135 | 140 |

The results obtained are as follows:

| System | % Conversion | $\overline{M}_v \times 10^{-5}$ |
|---|---|---|
| K | <98.0 | 2.49 |
| L | 99.7 | 2.13 |
| M | 99.9 | 2.03 |

As these results show, changes in the molecular weight and % conversion can be obtained by changing the initiator concentration. It is also possible to obtain this by changing initiators used in the polymerization, as shown below.

System N consists of 0.1 phm R-H + 0.05 phm LUPEROX 118 + 0.02 phm R-233. The results obtained with this system can be compared with those obtained with blend L described above.

| System | $ Conversion | $\overline{M}_v \times 10^{-5}$ |
|---|---|---|
| L | 99.7 | 2.13 |
| N | >99.9 | 2.16 |

These results show that while poly-functional initiators or initiator mixtures are desirable to reduce the cycle time of polymerization, the specific poly-functional initiator or mixture of initiator used, as well as the type of programmed temperature cycle used will depend on the specific requirements of the system and the results desired.

EXAMPLE 10

The wide flexibility in the selection of poly-functional initiators as a means to control the molecular weight of the polymer is demonstrated in this example.

The programmed temperature cycle used in the bulk polymerization of styrene was as follows:

| Time (Hours) | 0 | 0.5 | 1.0 | 2.0 | 3.0 | 4.0 | 5.0 |
|---|---|---|---|---|---|---|---|
| Temperature (° C) | 80 | 90 | 100 | 115 | 125 | 135 | 140 |

| System | Composition |
|---|---|
| O | 0.15 phm R-H + 0.05 phm LUPEROX 118 + 0.02 phm R-233 |
| P | 0.15 phm LUPERSOL 256 + 0.05 LUPEROX 118 + 0.02 phm LUPEROX 500R |
| Q | 0.20 phm LUPERSOL 256 + 0.05 phm TBPB |
| R | 0.15 phm R-C + 0.05 phm LUPEROX 118 + 0.02 phm LUPEROX 500R |
| S | 0.15 phm LUPERSOL 256 + 0.05 phm LUPERSOL 231 + 0.02 phm LUPEROX 500R |
| T | 0.15 phm R-C + 0.05 phm LUPERSOL 231 + 0.02 phm LUPEROX 500R |

The results obtained were as follows:

| System | % Conversion | $\overline{M}_v \times 10^{-5}$ |
|---|---|---|
| O | >99.9 | 2.53 |
| P | 99.9 | 2.50 |
| Q | >99.9 | 2.20 |
| R | 99.9 | 2.67 |
| S | 99.7 | 2.39 |
| T | 99.5 | 2.64 |

These results show that the initiator system can consist of two or more components, where at least one is a polyfunctional free radical initiator. The use of a polyfunctional initiator alone as a system instead of a multiplicity or combination of initiators is also useful as was shown in Example 4, where 0.25 phm R-BP was used alone.

EXAMPLE 11

This illustrates that the polymerization can be conducted such that during part of the reaction, a programmed temperature cycle is used and the final portion of the reaction is conducted isothermally. This method can be used to reduce the cycle time of polymerization and also as a means to control the molecular weight of the polymer. It is also useful in systems where certain reaction variables prevent the reaction temperature from exceeding a certain value, as, for example, in the manufacture of expandable polystyrene beads, where the reaction temperature is not allowed to increase substantially higher than 120° C so as to avoid excessive pressure build-up in the reactor.

The programmed temperature profile used was as follows:

| Time (Hours)     | 0  | 1.0 | 2.0 | 3.0 | 4.0 | 5.0 |
|------------------|----|-----|-----|-----|-----|-----|
| Temperature (°C) | 80 | 95  | 105 | 115 | 120 | 120 |

Note that the temperature is maintained at 120° C after the 4th hour and held constant for 1 hour.

The following four initiator systems blends were used in the bulk polymerization of styrene:

| System | Composition |
|--------|-------------|
| U | 0.15 phm LUPERSOL 256 + 0.05 phm LUPEROX 118 |
| V | 0.15 phm R-C + 0.05 phm LUPEROX 118 |
| W | 0.10 phm LUPERSOL 256 + 0.05 phm LUPEROX 118 + 0.05 phm LUPERSOL 231 |
| X | 0.10 phm LUPERSOL 256 + 0.05 phm LUPEROX 118 + 0.05 phm LUPERSOL 331 |

The results obtained are as follows:

| System | % Conversion | $\bar{M}_v \times 10^{-5}$ |
|--------|--------------|----------------------------|
| U | 99.1 | 2.85 |
| V | 99.2 | 2.90 |
| W | 99.8 | 2.67 |
| X | 99.6 | 2.71 |

In this example, the last stage of the polymerization is conducted isothermally. While this is not a necessary condition, it illustrates that any part of the polymerization can be conveniently conducted under isothermal conditions and the rest can be under non-isothermal conditions.

EXAMPLE 12

While in the preceding examples the polymerization was conducted in bulk, the applicability of this invention to suspension polymerization is demonstrated in this example.

A standard aqueous phase formulation consisting of deionized water and suspending agent was used in the polymerization of styrene. The following non-linear time-temperature profile was used in each of a bulk and suspension system:

| Time (Hours)     | 0  | 0.5 | 1.0 | 2.0 | 3.0 |
|------------------|----|-----|-----|-----|-----|
| Temperature (°C) | 80 | 100 | 120 | 135 | 140 |

The initiator system was a blend consisting of 0.25 phm R-H + 0.05 phm DTBA + 0.01 phm LUPEROX 500R.

The results obtained in suspension polymerization are compared with those in bulk polymerization under identical conditions.

|                       | Bulk    | Suspension |
|-----------------------|---------|------------|
| $\bar{M}_w =$         | 219,300 | 229,800    |
| $\bar{M}_v =$         | 201,200 | 211,000    |
| $\bar{M}_n =$         | 85,300  | 93,200     |
| $\bar{M}_w/\bar{M}_n$ | 2.57    | 2.47       |

These results show that the scope of the invention is equally applicable to suspension polymerization. Further it shows that for a given initiator system and a programmed temperature cycle, the molecular weight results for both the bulk and the suspension system are similar.

The molecular weight and the molecular weight distribution results obtained in this example are typical of commercial low molecular weight grade crystal polystyrene.

Even though an unsymmetrical difunctional sequential initiator was used (i.e. R-H), the molecular weight distribution of the polymer has a value that is quite comparable to commercial crystal polystyrene. The use of a programmed temperature cycle did not alter the distribution.

EXAMPLE 13

This example was conducted as in Example 12, in a suspension system and in a bulk system to polymerize styrene. In this example, one of the initiator compounds (i.e. BPO) is a monofunctional initiator. A different non-linear time-temperature profile was used to demonstrate the flexibility of the invention.

| Time (Hours)     | 0  | 0.5 | 1.0 | 2.0 | 3.0 | 4.0 | 4.5 |
|------------------|----|-----|-----|-----|-----|-----|-----|
| Temperature (°C) | 80 | 90  | 100 | 115 | 125 | 135 | 140 |

The initiator system used consisted of 0.25 phm BPO + 0.025 phm DTBA + 0.025 phm LUPEROX 500R. When the results obtained with suspension polymerization are compared with those obtained in bulk polymerization, they establish that, within the limits of experimental accuracy, they are identical.

|                       | Bulk    | Suspension |
|-----------------------|---------|------------|
| $\bar{M}_w$           | 202,800 | 209,550    |
| $\bar{M}_v$           | 183,700 | 189,550    |
| $\bar{M}_n$           | 76,600  | 78,650     |
| $\bar{M}_w/\bar{M}_n$ | 2.65    | 2.66       |

Other parameters, such as the amount and type of suspending agent or agents used, the rate of stirring, pH of the aqueous phase and control of the pH by adding buffering agent(s) etc. are well known to those skilled in the art. In the practice of this invention, one is not restricted to any specific suspending agent or pH.

EXAMPLE 14

While the preceding examples demonstrated the applicability of the invention in the polymerization of vinyl aromatic monomers (e.g. styrene), this example shows that the invention is equally applicable in the polymerization of other vinyl monomers such as vinyl and acrylic esters. To illustrate this, methyl methacrylate was used as the monomer and 4-butyrolactone as the solvent. The ratio of the monomer to solvent was 1:3.

The initiator systems used were as follows:

| System | Composition |
| --- | --- |
| Y | 0.25 phm BPO + 0.05 phm TBPB |
| Z | 0.25 phm R-C + 0.05 phm R-262 |
| AA | 0.02 phm LUPERSOL 256 + 0.05 phm LUPEROX 118 + 0.05 phm R-262 |
| R-C | 0.30 phm R-C |

The programmed temperature profile used was as follows:

| Time (Hours) | 0 | 0.5 | 1.0 | 2.0 | 3.0 | 4.0 | 5.0 |
| --- | --- | --- | --- | --- | --- | --- | --- |
| Temperature (° C) | 60 | 70 | 80 | 90 | 100 | 110 | 120 |

The results obtained are as follows:

| System | $M_v \times 10^{-5}$ | % Converstion |
| --- | --- | --- |
| Y | 1.30 | 90.3 |
| Z | 2.14 | 92.4 |
| AA | 1.55 | 95.2 |
| R-C | 2.50 | 90.5 |

These results show that a mixture of monofunctional initiators (i.e. System Y) gave the lowest molecular weight polymer as compared to other initiator mixtures. The yield of the polymer (i.e. % conversion) was also the lowest with monofunctional initiators.

The results further ilustrate that poly-functional initiators can be used alone (R-C) or in mixtures (e.g. System Z and AA). Further, Systems Z and R-C illustrate the effect of a difunctional sequential initiator (i.e. R-C) while System AA does not contain any known sequential initiator.

The above example illustrates that the process of the present invention can be used in the polymerization of vinyl and vinylidene monomers.

EXAMPLE 15

This example illustrates the applicability of the invention in the manufacture of high impact polystyrene which involves the polymerization of styrene monomer containing dissolved elastomer.

The polymerization procedure used is the same as in bulk polymerization of styrene described previously. The only change being that the styrene monomer used contained approximately 5g. of elastomer dissolved in 100g. of styrene. After the polymerization was complete, the contents of the test-tube were transferred to a beaker containing approximately 100 ml. of benzene. The benzene insoluble material, i.e. the gel, was centrifuged out of solution using calibrated centrifuge tubes. The volume of the swollen gel was noted prior to drying.

The benzene soluble material was precipitated in methanol, filtered and then dried in a vacuum oven at 50° C. The molecular weight of this fraction was calculated by determining the intrinsic viscosity. The details of intrinsic viscosity measurements have been described previously.

Certain terms which are used in presenting the results are defined as follows:

(a) % Total Gel is the weight of the benzene insoluble material expressed on a percentage basis.

(b) % Elastomer is the weight of elastomer dissolved in 100g. of styrene monomer.

(c)

$$\% \text{ Graft} = \frac{(\% \text{ Total Gel} - \% \text{ Elastomer})}{(100 - \% \text{ Elastomer})}$$

(d) % Insoluble PS is the weight percent of polystyrene which is insoluble in benzene. This is equal to (% Total Gel - % Elastomer)

(e)

$$\text{Graft/Rubber Ratio} = \frac{\% \text{ Insoluble PS}}{\% \text{ Elastomer}}$$

Two initiator systems were used in the polymerization.

| System | Composition |
| --- | --- |
| Y | 0.25 phm BPO + 0.05 phm TBPB |
| R-C | 0.30 phm R-C |

The two elastomers used were:

Taktene 1202 - a high cis (98%) 1,4 polybutadiene manufactured by Polysar.

It is characterized by the following molecular weights.

$\overline{M}_n = 82,380$ $\overline{M}_w = 375,000$ $\overline{M}_z = 1,043,000$ $\overline{M}_w/\overline{M}_n = 4.56$ Kraton 101 is a triblock copolymer consisting of polystyrene-polybutadiene-polystyrene segments. It is manufactured by Shell.

The non-linear programmed temperature cycle used was as follows:

| Time (Hours) | 0 | 0.5 | 1.0 | 2.0 | 3.0 | 4.0 | 5.0 |
| --- | --- | --- | --- | --- | --- | --- | --- |
| Temperature (° C) | 80 | 90 | 100 | 115 | 125 | 135 | 140 |

The elastomer concentration was 4.8%.
The results obtained were as follows:

| Elastomer | $\overline{M}_v \times 10^{-5}$ | % Graft | Graft:Rubber Ratio | System |
| --- | --- | --- | --- | --- |
| Taktene 1202 | 1.75 | 36.8 | 7:1 | Y |
| Taktene 1202 | 2.52 | 46.4 | 8.8:1 | R-C |
| Kraton 101 | 1.76 | 20.0 | 3.8:1 | Y |
| Kraton 101 | 2.66 | 28.4 | 5.4:1 | R-C |

The results show that the molecular weight of polystyrene (benzene soluble fraction) is higher when a difunctional initiator is used, (i.e. System R-C) irrespective of the type of elastomer used. Blend Y, a mixture of two monofunctional initiators (BPO and TBPB), is used as a control.

The above results also show that the amount of grafting obtained is higher when the difunctional initiator for a given elastomer.

EXAMPLE 16

In this example a mixture of difunctional initiators was used in a bulk polymerization and the results were compared to those obtained with a mixture of monofunctional initiators. The procedure and the programmed temperature cycle described in Example 15 was used.

| System | Composition |
|---|---|
| Y | 0.25 phm BPO + 0.05 phm TBPB |
| BB | 0.25 phm R-C + 0.05 phm LUPEROX 118 |

The elastomer used was Taktene 1202; 4.8g. of this was used per 100 g. of styrene.
The results obtained were as follows:

| System | $\overline{M}_v \times 10^{-5}$ | % Graft | Graft:Rubber Ratio |
|---|---|---|---|
| Y | 1.67 | 38.0 | 7.54:1 |
| BB | 2.28 | 47.5 | 9.42:1 |

These results show that a mixture of poly-functional initiators is also efficient to obtain higher molecular weight polymer and to increase the amount of grafting.

EXAMPLE 17

The general procedure used in this example is the same as described in Example 15, except that the polymerization was conducted in solution using ethylbenzene as the solvent.

As in the previous experiment, 4.8g. of Taktene 1202 was dissolved in 100g. of styrene. 5g. of this monomer solution was used for the polymerization along with 10g. of ethylbenzene. Since ethylbenzene acts as a chain transfer agent in the polymerization of styrene, no differences in the molecular weight of the polymer would be expected; and therefore, the molecular weight of the polymer was not measured.

As opposed to the preceding two examples, the difunctional initiator mixture in this example does not contain any sequential initiator. Yet improved grafting was obtained.

The programmed temperature cycle used was the same as described in Example 15.
The following two initiator systems were used:

| System | Composition |
|---|---|
| Y | 0.25 phm BPO + 0.05 phm TBPB |
| CC | 0.25 phm LUPERSOL 256 + 0.05 phm LUPEROX 118 |

| Blend | % Graft | Graft:Rubber Ratio |
|---|---|---|
| Y | 25.3 | 5.1:1 |
| CC | 53.7 | 10.7:1 |

These results show that poly-functional initiator mixtures, with or without a sequential initiator, can increase the amount of grafting obtained in the system.

These examples 15, 16 and 17 show that an increase in grafting is obtained when one or more poly-functional initiators are used either alone or in combination with one or more monofunctional free radical initiators.

EXAMPLE 18

A symmetrical diperester, 1,4 di-(t-butylperoxycarbonyl)cyclohexane, (in the form of an isomeric mixture) designated "BPC-CH" was used as an initiator, alone and in combination with other initiators. The following three initiator systems were used:

| System | Composition |
|---|---|
| BPC-CH | 0.25 phm 1,4 di-(t-butylperoxycarbonyl)cyclohexane |
| DD | 0.25 phm 1,4 di-(t-butylperoxycarbonyl)cyclohexane + 0.05 phm LUPEROX 118 |
| EE | 0.10 phm 1,4 di-(t-butylperoxycarbonyl)cyclohexane + 0.05 phm LUPEROX 118 + 0.02 phm R-233 |

The polymerization was conducted using the following time-temperature profile:

| Time (Hours) | 0 | 0.5 | 1.0 | 2.0 | 3.0 | 4.0 | 5.0 |
|---|---|---|---|---|---|---|---|
| Temperature (° C) | 80 | 90 | 100 | 115 | 125 | 135 | 140 |

The results obtained are as follows:

| System | % Conversion | $\overline{M}_v \times 10^{-5}$ |
|---|---|---|
| BPC-CH | 95.2 | 1.81 |
| DD | >99.9 | 1.84 |
| EE | >99.9 | 2.36 |

This example shows that symmetrical diperesters such as isomeric mixtures containing 1,4 di-(t-butylperoxycarbonyl)cyclohexane can be used alone or in combination with other initiators, using a programmed temperature cycle, to obtain polymers with commercially acceptable molecular weight.

As can be seen from the foregoing examples, the preferred initiator system in the practice of this invention is dependent on the desired polymer molecular weight. As a rule it will consist of a sequential initiator as the low temperature component. Thus the preferred system for styrene comprises LUPERSOL 256 or the diperester identified as "R-C".

The other components of the initiator system will be dependent on the desired molecular weight. Thus, for producing high molecular weight polystyrene (i.e. $\overline{M}_v$ about 300,000), a preferred initiator system is:

| LUPERSOL 256 | 0.10 phm |
| LUPEROX 118 | 0.05 phm |
| LUPEROX 500R | 0.02 phm |

Another preferred initiator system for styrene is:

| R-C | 0.15 phm |
| LUPEROX 500R | 0.02 phm |

I claim:
1. A process for the free radical polymerization of vinyl monomers, including vinyl aromatic monomers, comprising polymerizing said monomer wherein the temperature of the polymerization is progressively increased by at least 30° C during the period of the polymerization in a temperature range of from 50° C to 160° C and wherein the final temperature is at least 110° C, the polymerization mass including an initiator sensitive to produce free radicals near or at the low temperature end of the range and an initiator sensitive to produce free radicals near or at the high temperature end of the range, wherein at least one of the initiators is a poly- functional free radical initiator, and the resulting polymer has a unimodal molecular weight distribution.

2. The process of claim 1 wherein said temperature is caused to continuously increase at a uniform rate with respect to polymerization time during said major part of said polymerization time.

3. The process of claim 1 wherein the rate at which said temperature is continuously increased varies during said major part of said polymerization time.

4. The process of claim 1 wherein the rate at which said temperature is continuously increased is in the range of 1° to 50° C per hour.

5. The process of claim 1 wherein at least 75% of said monomers are polymerized while said temperature is caused to increase continuously and wherein the temperature is maintained at a final constant temperature to effect polymerization of substantially all of the remainder of said monomers.

6. The process of claim 1 wherein said unsaturated monomer is styrene.

7. The process of claim 1 wherein said polyfunctional free-radical polymerization initiator is selected from one or more symmetrical and unsymmetrical azo, azo-peroxide and peroxide compounds excepting those unsymmetrical diperoxides in which the two peroxide functions are separated by less than 6 carbon atoms.

8. The process of claim 7 wherein said polyfunctional initiator is selected from 4 and 5-(t-butylperoxycarbonyl)-3-hexyl-6-[7-(t-butylperoxycarbonyl)-heptyl]cyclohexene, 4 and 5-(t-butylperoxycarbonyl)-3-pentyl-6-[8-(t-butylperoxycarbonyl)octyl]-cyclohexene and mixtures thereof.

9. The process of claim 8 wherein said polyfunctional initiator comprises 2,5-dimethyl-2,5-bis[2-ethylhexanoylperoxy]-hexane.

10. The process of claim 7 wherein said initiator comprises an azo-peroxide.

11. The process of claim 9 wherein said azo-peroxide is di-t-butyl-4,4'-azobis-(4-cyanoperoxyvalerate).

12. The process of claim 1 wherein said unsaturated monomer is selected from styrene, methylmethacrylate, acrylonitrile, methacrylonitrile vinyl acetate and vinyl chloride.

* * * * *